US007321115B2

(12) United States Patent
Langlois et al.

(10) Patent No.: US 7,321,115 B2
(45) Date of Patent: Jan. 22, 2008

(54) SENSOR HOUSING HAVING LOCKING MEMBER WITH MULTIPLICITY OF ANGULAR ROTATIONS AND METHODS OF ALIGNING

(75) Inventors: Damon H. Langlois, Victoria (CA); Donald A. Cleland, Langford (CA); Colleen D. McCarthy, North Saanich (CA)

(73) Assignee: Streetlight Intelligence International, Ltd, Victoria, BC (CA)

( * ) Notice: Subject to any disclaimer, the term of this patent is extended or adjusted under 35 U.S.C. 154(b) by 3 days.

(21) Appl. No.: 11/303,410

(22) Filed: Dec. 16, 2005

(65) Prior Publication Data

US 2007/0001113 A1 Jan. 4, 2007

(51) Int. Cl.
*H01J 5/02* (2006.01)
(52) U.S. Cl. .................................... 250/239; 250/214.1
(58) Field of Classification Search ................ 250/239, 250/214.1, 231.13
See application file for complete search history.

(56) References Cited

U.S. PATENT DOCUMENTS

| | | | |
|---|---|---|---|
| 3,584,228 A | 6/1971 | Kenyon | |
| 4,568,826 A | 2/1986 | Pitel et al. | |
| 4,791,290 A | 12/1988 | Noone et al. | |
| 5,056,069 A | * 10/1991 | Granz et al. | ................. 367/164 |
| 5,239,130 A | * 8/1993 | Brasse | ......................... 174/542 |
| D339,997 S | 10/1993 | Manor, Jr. et al. | |
| D348,621 S | 7/1994 | Blake | |
| 5,698,975 A | 12/1997 | Kayserman | |
| D395,408 S | 6/1998 | Wiesemann | |
| 5,892,330 A | 4/1999 | Widmayer | |

OTHER PUBLICATIONS

Royce Thompson Ltd. data sheet for Mono-Star from www.roycethompson.com Dec. 15, 2005.
Royce Thompson Ltd. data sheet for Oasis from www.roycethompson.com Dec. 15, 2005.
Royce Thompson Ltd. data sheet for Tri-Star from www.roycethompson.com Dec. 15, 2005.

* cited by examiner

*Primary Examiner*—Que T Le
(74) *Attorney, Agent, or Firm*—Charles W. Bethards

(57) ABSTRACT

A housing 200 for securing a photo sensor 405 where the housing includes a lower body 211 configured to selectively engage a base 203 at one of a multiplicity of angular rotations relative to the base and an upper body 209 configured to hold the photo sensor. In various embodiments, a locking member 205 is disposed, e.g., within a slot 417 in the lower body, and configured to secure the housing to the base in the one of the multiplicity of angular rotations. A corresponding method of providing and aligning a sensor housing is described.

32 Claims, 4 Drawing Sheets

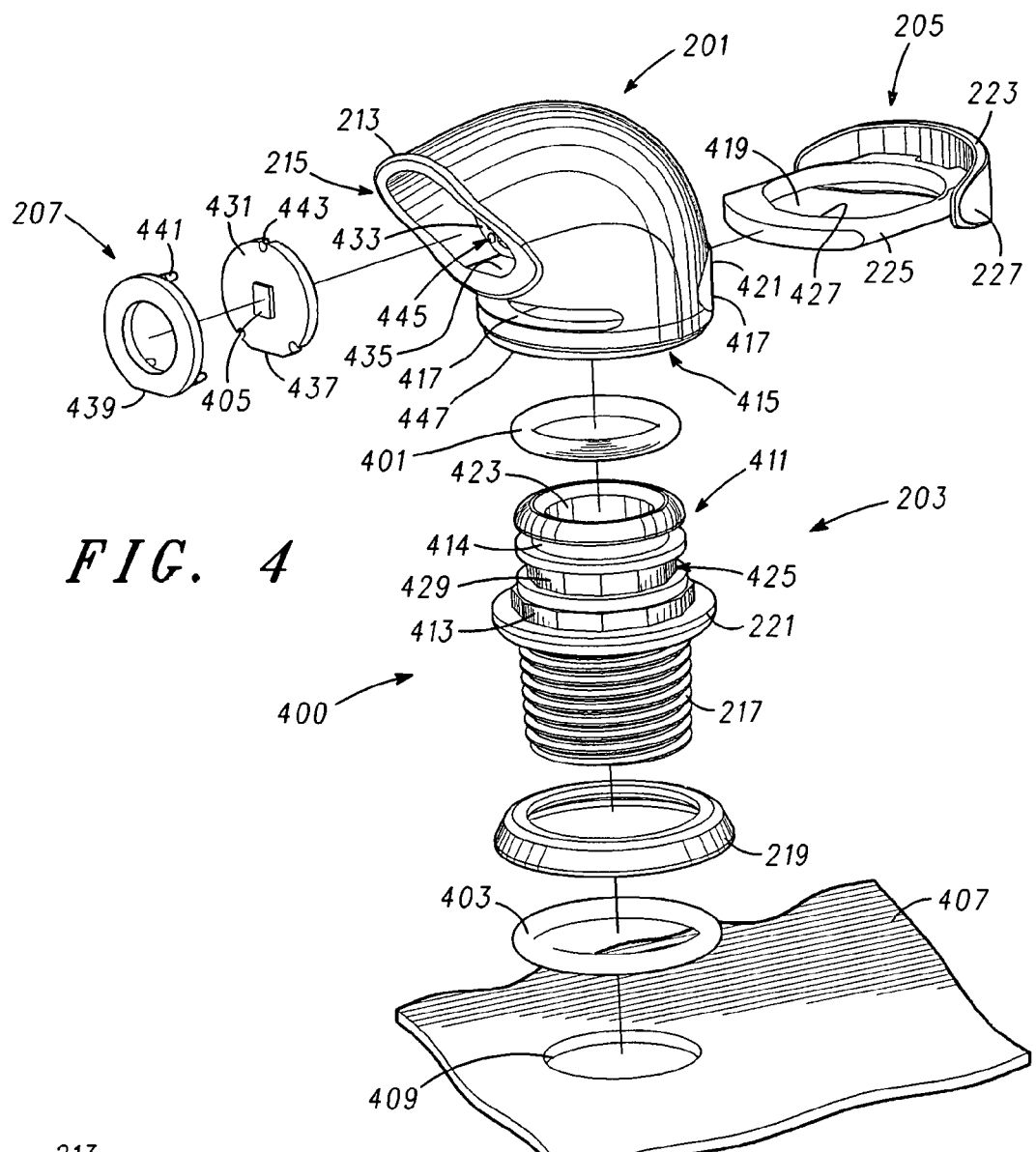
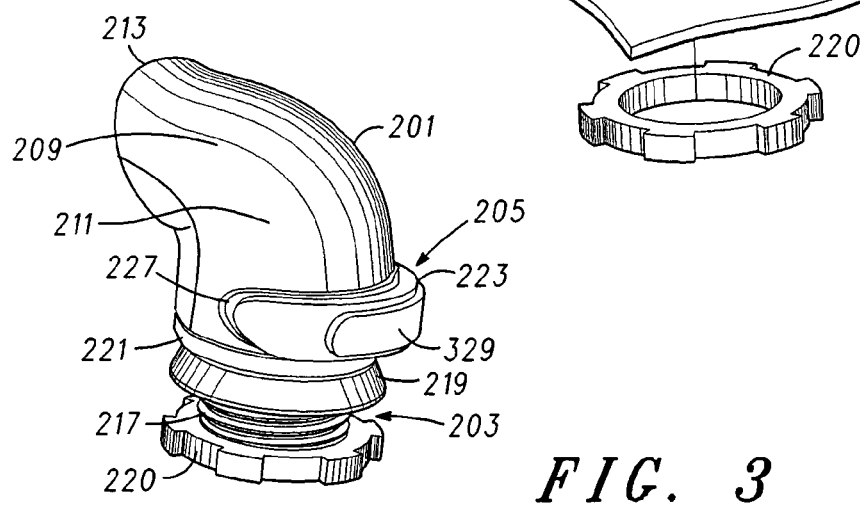
FIG. 4
FIG. 3

US 7,321,115 B2

SENSOR HOUSING HAVING LOCKING MEMBER WITH MULTIPLICITY OF ANGULAR ROTATIONS AND METHODS OF ALIGNING

FIELD OF THE INVENTION

This invention relates in general to housing and more specifically to techniques and apparatus for mounting, protecting, and securing a sensor, such as a photo sensor in a housing.

BACKGROUND OF THE INVENTION

Various sensors including photo sensors are known. Using these sensors, e.g., photo sensors, to facilitate control of lighting systems is also known. For example, a photo sensor may be used to facilitate control of a luminaire such that the luminaire is off during daylight hours and on during night time hours.

Typically these sensors are mounted to the luminaire in some fashion, however little effort has been devoted to insuring that these mounting arrangements are flexible. Thus, pointing or aiming the sensors in a proper direction, e.g., away from or toward a light source, can be overly burdensome and may necessitate at least a partial disassembly of the luminaire. Furthermore, if for any reason the direction that a sensor should be pointed changes, e.g., a street light is reoriented, the efforts including possibly disassembly and reassembly of the luminaire must be repeated. Even when these efforts may be viewed as straightforward even though time consuming, it can be still be problematic if not dangerous, e.g., when the technician is in an overhead hoist several feet above the ground at the street light level.

One known technique uses a receptacle mounted to a luminaire that is mated with a connector on a photo sensor with the connector serving to couple to signals from the photo sensor to control systems internal to the luminaire. This technique results in a fixed orientation for the photo sensor where it can be difficult to correct or modify the orientation. Furthermore when this socket arrangement is used in outdoor environments corrosion may lead to a failure of the photo sensor. Where the receptacle or photo sensor housing is secured via a threaded coupling to a luminaire, the threaded coupling can be loosened (un-screwed) in order to provide some flexibility in orientation. However, loosening the threaded coupling can result in an unsecured attachment that can degrade over time. Furthermore, these threaded couplings are notoriously poor at preventing water penetration.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 and FIG. 3 in representative forms, show more detailed diagrams of a sensor housing as assembled in accordance with one or more embodiments;

FIG. 4 depicts a representative exploded view of the sensor housing of FIG. 1-FIG. 3 in accordance with one or more embodiments;

DETAILED DESCRIPTION

Figure 1:
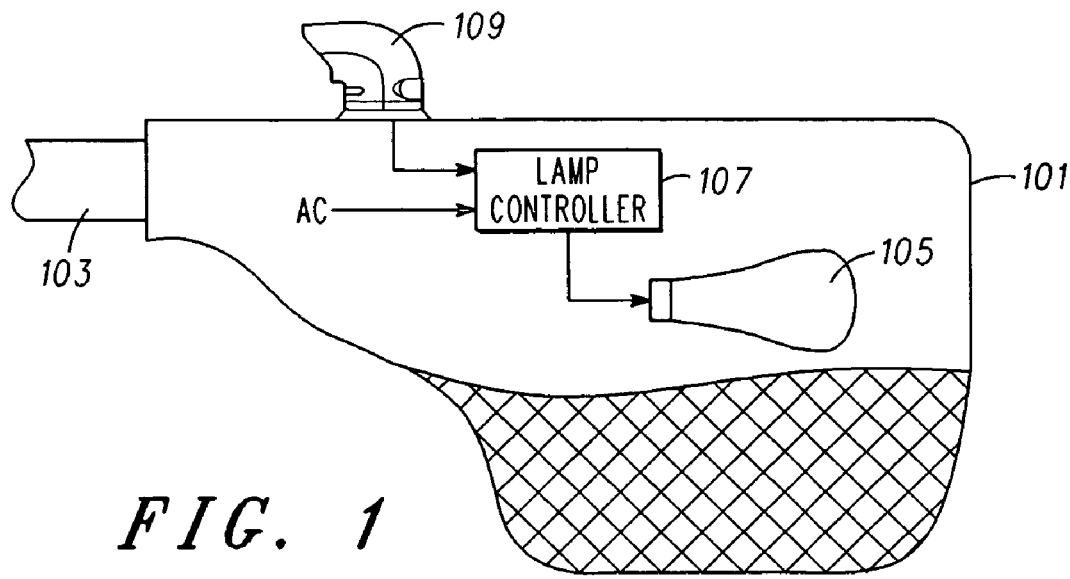
FIG. 1 depicts in a simplified and representative form, a diagram of a sensor housing as it may be used with a luminaire in accordance with one or more embodiments.

In overview, the present disclosure concerns housings, covers or the like, e.g., sensor housings, and more specifically techniques and apparatus for securing, protecting, and aligning or orienting such sensors that are arranged and constructed for use in various environments, including severe outdoor environments. More particularly various inventive concepts and principles embodied in methods and apparatus that facilitate easy installation and adjustment of sensors and the like will be discussed and disclosed.

The sensors that are of particular interest may vary widely but include photo sensors. Such sensors can be subject to extreme outdoor environments over long periods of time and necessitate relatively exacting adjustments in order to operate properly. For example, in systems, equipment and devices that employ photo sensors for various elements of control, e.g., street lighting systems, parking lot lighting systems, or indoor lighting systems, where the photo sensor must be properly aimed, aligned, or oriented, the present apparatus and methods can be particularly advantageously utilized, provided they are practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with mechanical components that may be fashioned using various fabrication technologies, e.g., injection molding or various metal working techniques. It is expected that one of ordinary skill, notwithstanding possibly significant effort and many design choices motivated by, for example, available time, current technology, and economic considerations, when guided by the concepts and principles disclosed herein will be readily capable of selecting appropriate fabrication technologies and generating or otherwise providing appropriate tooling to generate such components. Therefore, in the interest of brevity and minimization of any risk of obscuring the principles and concepts according to the present invention, further discussion of fabrication of such components, if any, will be limited to the essentials with respect to the principles and concepts of the various embodiments.

Referring to FIG. 1, a simplified and representative diagram of a sensor housing as it may be used with a luminaire in accordance with one or more embodiments will be briefly discussed and described. In FIG. 1, a luminaire 101 such as may be mounted to a street lamp arm 103 is depicted. In street lamps as well as other lighting systems, the luminaire will include a lamp 105 that can be driven from a lamp controller 107. The lamp controller 107 typically will be coupled to a power source, e.g., AC power as shown, and typically coupled to one or more sensors (secured within sensor housing 109) that assess one or more environmental variable.

For example, a typical outdoor lighting system will be disabled or shutoff during daylight or high ambient light hours and enabled during nighttime or other low ambient light hours where the day/night or high/low ambient light conditions can be measured by a photo sensor, e.g., a photo sensor secured and protected by the housing 109. Generally the housing 109 will be mechanically secured to the luminaire. Furthermore, in order for the sensor (photo sensor) to provide a reliable reading it must be properly aimed and aligned in order to avoid hot spots (e.g., bright lights). For example if the sensor is used to determine whether it is day or night it may be important to aim the sensor away from an easterly or westerly direction in order to avoid an inaccurate reading due to sunup or sundown conditions. Typically such photo sensors are aimed toward a northerly direction to avoid the sunup/sundown situations. Similarly an indoor system or luminaire may have to aimed away from a particular source (e.g., bright emergency exit sign). For various reasons, it can be advantageous if the housing 109 can be secured to the luminaire 101 prior to installation of the luminaire (with the housing 109). Since it is often not known what the orientation of the luminaire will be relative to a desired aiming direction for the sensor either at installation of subsequent thereto, it can be very advantageous if the photo sensor can be easily and properly aimed, aligned, or oriented after installation of the luminaire.

Figure 2:
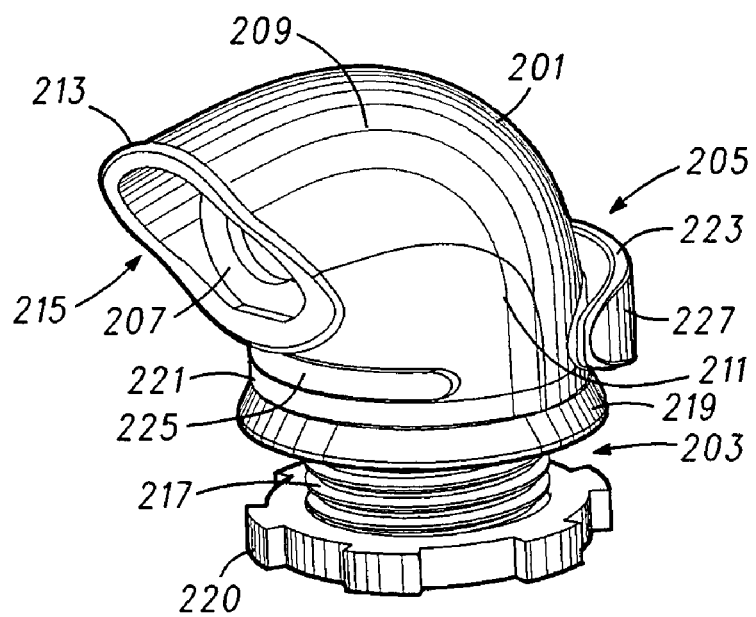

Referring to FIG. 2 and FIG. 3, representative and more detailed diagrams of a sensor housing (e.g., similar to housing 109) in accordance with one or more embodiments, as assembled and from different perspectives will be briefly discussed and described. FIG. 2 shows the sensor housing from a top, front and right side perspective, while FIG. 3 depicts a top, back, and right side view. In FIG. 2 and FIG. 3, the sensor housing comprises a cover 201 (alternatively a housing 201), a base 203, and a locking member 205. The cover or housing 201 is configured to hold a sensor, e.g., behind a retainer ring 207 and in one or more embodiments to engage the base 203 at any one of a multiplicity of angular rotations, e.g., discrete or predetermined angular rotations (with respect to the base 203).

As shown the cover 201 in one or more embodiments, is generally rounded and "L" shaped with an upper portion 209 disposed substantially perpendicular to a lower portion 211, where the upper portion can include a lip 213 and an overhanging portion 215. The upper portion 209 can be tapered from the lower portion toward the overhanging portion and generally shaped, e.g., rounded in a convex (from top to sides) manner to facilitate shedding various elements (rain, snow, bird droppings, etc.) or shielding the sensor from such elements.

The base 203 as shown is generally round and includes a threaded portion 217 that may pass through a shroud 219. The shroud provides weather protection for an o-ring that is not visible in these figures (see FIG. 4, o-ring 403). A locking nut 220, such as a pipe threaded nut with locking tabs (as may be found in electrical conduit installations) can be engaged with the threaded portion 217. Generally the base 203 is secured to a surface, e.g., a luminaire, by the locking nut 220, where the locking nut will be on one side, e.g., interior side, of the surface and the shroud (above the o-ring) will be on the other side, e.g., exterior side, of the surface and will rest against a shoulder 221 of the base 203 once secured. The o-ring is compressed or pinched between the shoulder and shroud and the luminaire or other surface by the locking nut 220 and thus will form a weather resistant seal. This seal as is known may be enhanced with an appropriate compound, e.g., silicon based compound.

The locking member 205 is disposed and configured to secure the cover and the base in one of the multiplicity of angular rotations to thereby appropriately aim or align the sensor. The locking member further comprises a head end 223, a leg 225 and one or more tabs 227. In one or more embodiments, the locking member 205, specifically leg 225, is configured to be disposed in a slotted opening (see FIG. 4 417) in the cover 201 with the tabs being resilient and disposed adjacent to the cover. When pressure is applied to the head end, the resilient tabs will flex and the leg will move forward and release the cover from the base as will become more evident from the below discussions of an exploded view of FIG. 4.

In various exemplary embodiments the cover, base, locking member, retainer ring, and shroud are each fabricated, e.g., in an injection molding process. Since the sensor housing may be installed for tens of years and possibly in an outdoor environment, appropriate care must be taken in selecting materials, e.g., using a UV tolerant material. For example, a polycarbonate based material, either a copolymer or glass filled material, may be appropriate in some embodiments or alternatively a UV tolerant finish (paint or the like) over another material may be appropriate in various other embodiments. The locking nut 220 is fabricated from a metal that is weather resistant or is finished with a weather resistant finish, e.g. anodized or nickel finish, and includes angled locking features as is known. Any o-rings can be fashioned from and comprise a resilient material, e.g., Vitron, durometer 75 shore A or the like, or other suitable material.

Referring additionally to FIG. 4, a representative exploded view of the sensor housing of FIG. 1-FIG. 3 in accordance with one or more embodiments will be discussed and described. FIG. 4 shows the housing or cover 201, base 203, locking member 205, retainer ring 207, an upper o-ring 401, a lower o-ring 403, a sensor 405, a surface 407 with an opening 409, and various other elements that will be discussed and described. FIG. 4 shows a sensor housing 400 that, as noted above, includes the base 203, the cover 201 that is configured to hold a sensor 405 and selectively engage the base at one of a multiplicity of predetermined angular rotations; and the locking member 205 that is disposed and configured to secure the cover and the base in any one of the multiplicity of predetermined angular rotations.

In various embodiments, the sensor housing 400 or specifically the base 203 further comprises the shoulder 221 and the threaded member 217 that is configured to pass through the shroud 219 and the lower o-ring 403 such that the shroud 219 is disposed adjacent to the shoulder 221 and above the o-ring 403. Thus the o-ring provides a weather resistant seal between the base and a surface 407 when the base 203 is secured to the surface 407 with the locking nut 220 engaged with the threaded member 217. In practice and advantageously a technician in the process of installing the sensor housing 400 to the surface 407 of, for example, a luminaire, can insert the threaded portion of the base through the shroud 219 and the lower o-ring 403 with an appropriate sealing compound, if desired, and then insert this subassembly into the opening 409 in the surface 407, e.g., portion of the luminaire, and secure the base 203 to the surface (at an arbitrary angular position or rotation relative to the surface) with the locking nut 220. Note that this can be done before any final installation of the luminaire.

Figure 6:
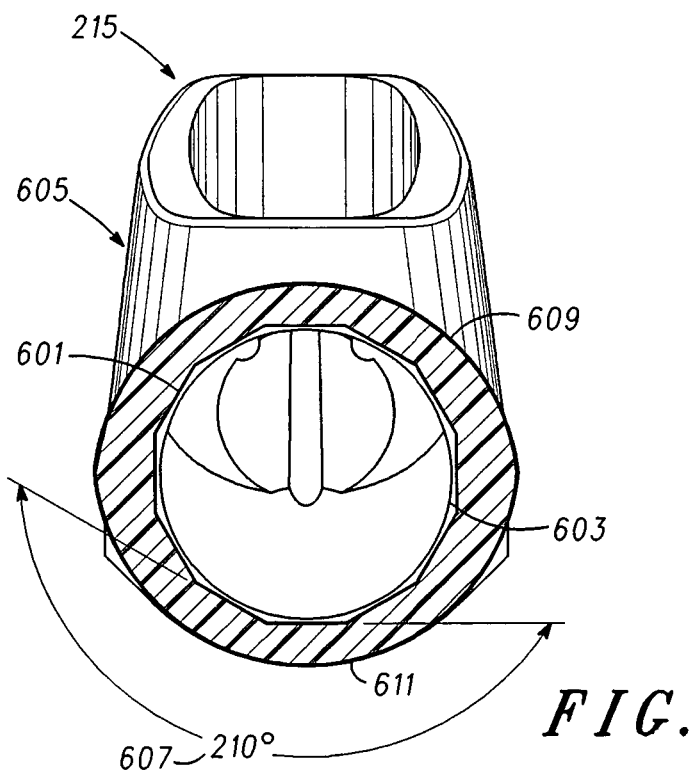
FIG. 6 shows a bottom plan view of a cross section through a housing in accordance with one or more embodiments.

In one or more embodiments, the base 203 further comprises an engagement member 411 that has a multi-faceted surface 413, e.g., forms a polygon or the like surface, and the cover 201 or housing further comprises a complementary multi-faceted surface (see FIG. 6 601 but not specifically shown in FIG. 4). Note that in the depicted embodiment when engaged, the cover 201 overlaps the base 203, specifically the engagement member 411, such that the multi-faceted surface 413 that is disposed about an exterior of the engagement member 411 is overlapped by the complementary multi-faceted surface that is disposed about an interior of the cover 201. In this arrangement, the cover is configured to be disposed over and surround the engagement member 411 and configured to removably engage the base at one of the multiplicity of angular rotations, e.g., discrete or predetermined angular rotations, that provides a desired or predetermined orientation or aiming direction for aligning the cover. In alternative embodiments as will be appreciated by those of ordinary skill given the present teachings, the cover could include the engagement member and the base could be disposed over this cover and thus the various elements would essentially be complementary to those depicted.

In some embodiments such as the embodiment specifically depicted, the cover and the base can be selectively engaged only when the multi-faceted surface 413 and the complementary multi-faceted surface (see FIG. 6 601) are aligned at any one of the multiplicity of discrete or predetermined angular rotations. Engagement of the cover and the base in various embodiments comprises rotationally aligning the cover and the base to one of the predetermined angular rotations and then sliding, moving, or displacing the cover toward the shoulder until it is adjacent to the shoulder. In any other position or relative position the cover and the base, specifically the multi-faceted and complementary multi-faceted surfaces will interfere and thus the cover and the base can not be engaged. Note that a straight forward procedure is followed when the cover needs to be re-aligned or aimed. The cover is disengaged from the base, and rotated relative to the base, and then re-engaged to the base. While the multi-faceted surface 413 depicted is a polygon that in one embodiment is a 12 sided polygon, various surfaces, e.g., more traditional gear like surfaces or adjacent surfaces with a frictional fit, can equally serve the purpose. The appropriate surface can be selected taking into account the resolution needed in terms of angular degrees (12 sided=360/12=30 degree resolution, meaning that aiming can be no more than 15 degrees from a theoretical ideal), material being used, thickness of structures, etc. Note also that when the cover and the base are engaged, the interference between the multi-faceted surface 413 and the complementary multi-faceted surface (601) insures that the cover and base will no longer rotate relative to one another so long as they are engaged. Note that in other embodiments, not specifically depicted, the cover and the base can be arranged (e.g., a resilient washer between a surface on the cover and another on the base) such that when they are engaged a frictional force must be overcome before they can be rotated relative to one another. In such embodiments aiming or aligning the cover in a desired direction requires overcoming the frictional force and rotating the cover relative to the base.

The engagement member 411 in various embodiments can further comprise a groove 414 configured with corresponding shoulders as depicted for disposal of an o-ring, e.g., the upper o-ring 401, wherein the o-ring provides a weather resistant seal between the cover and the engagement member when the cover and the base are engaged. This weather resistant seal can be enhanced by applying an appropriate compound, e.g., a silicon based compound to the o-ring 401 and corresponding groove 414.

Referring to FIG. 2 and FIG. 3, as well as FIG. 4, in somewhat more detail and in one or more embodiments, the cover 201 or housing as noted earlier further comprises a lower body 211 that is arranged and configured to selectively engage the base 203 at any one of a multiplicity of predetermined angular rotations and an upper body 209 that is configured to hold the sensor 405. In various embodiments, the cover 201 further comprises a cover bore 415 that extends, e.g., through the lower and upper bodies and a slotted opening 417 disposed transversally or generally perpendicularly to the cover bore 415.

The locking member 205 can further comprise a leg 225 with an opening 419, where the leg is configured to be disposed in or within the slotted opening, i.e., disposed as shown in FIG. 2 and FIG. 3. As noted briefly above, the locking member 205 in some embodiments further comprises a head end 223 and at least one resilient tab 227 (two shown). The head end may also advantageously include an area 329 (see FIG. 3) where an indicia of origin or the like can be placed. The resilient tab is configured to be disposed adjacent to the cover 201 at a raised area 421 and arranged to flex when pressure is applied to the head end and the tab is thus pressed against the raised area 421. It will be appreciated that the head end will need to have a slightly smaller radius or circumference than the raised area in order to have room for the head end to move and thus result in the leg moving within the slotted opening when pressure is applied and the tab is flexed.

The base 203 or specifically the engagement member 411 in one or more embodiments is arranged for disposal in the cover bore 415 through the opening 419 in the leg 225 thus facilitating the locking member 411 securing the cover 201 and the base 203 in the one of the multiplicity of angular rotations until pressure is applied to the head end 223. This is accomplished in one or more embodiments as follows. The base 203 further comprises a bore or base bore 423 that passes through the base. The base or engagement member 411 also comprises a locking groove 425 with corresponding shoulders (note one shoulder as depicted is shared with the o-ring slot 414) that is disposed transversally to the bore and at an appropriate vertical distance.

The vertical distance, e.g. distance from the shoulder 221 or upper surface thereof is such that when the leg 225 is disposed in the slotted opening 417 and the base or engagement member is disposed in the cover bore 415 through the opening in the leg 419 such that the cover 201 is engaged with the base 203, a portion 427 of the leg will be aligned with and can be disposed in the locking groove 425 at least until pressure is applied to the head end 223. When engaged, the cover 201 is fixed rotationally to the base by the multi-faceted surfaces 413, 601 and without pressure being applied to the head end, the resilient tabs 227 will keep the portion of the leg within the locking groove 425, thereby insuring that no vertical motion of the cover relative to the base is possible. The locking groove in some embodiments as shown can have a bottom surface 429 that includes a further multi-faceted surface (polygon or the like) wherein the portion 427 of the leg includes a complementary multi-faceted surface that meshes with a portion of the multi-faceted surface when the cover and the base are secured in one of the multiplicity of angular rotations.

Figure 5:
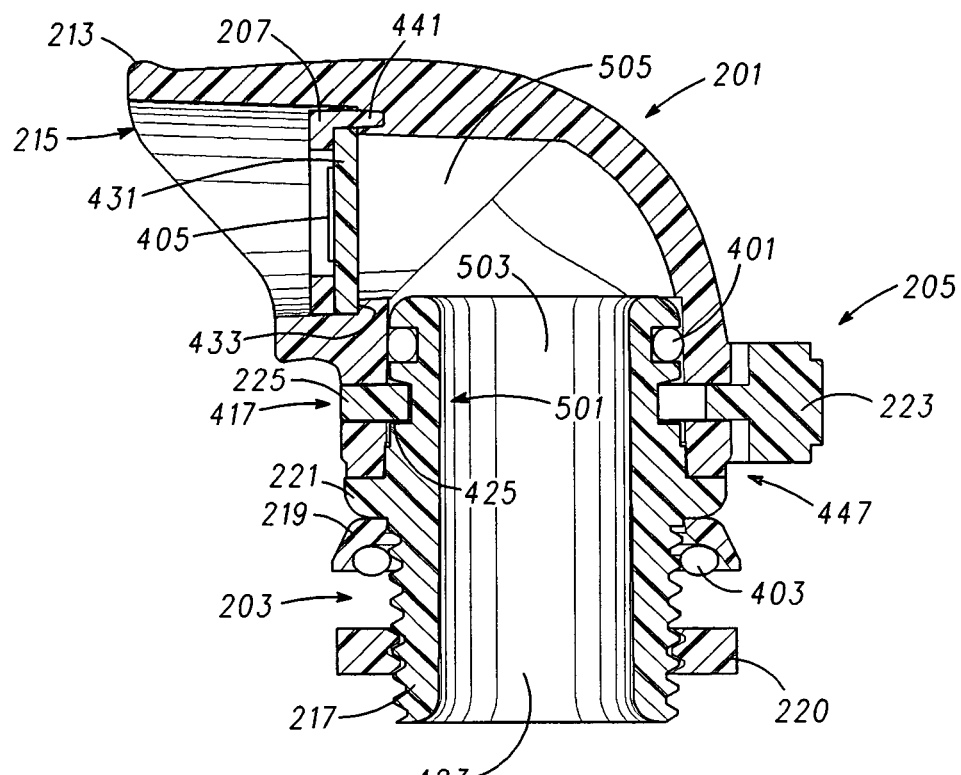
FIG. 5 depicts a representative cross sectional view of the sensor housing of FIG. 2 -FIG. 3 in accordance with one or more embodiments.

Continuing to refer to FIG. 2 through FIG. 4 as well as the cross sectional view of FIG. 5, but focusing more on the housing or cover 201, this housing is arranged and configured for securing or mounting a sensor, e.g., photo sensor or sensor 405 in various embodiments. As noted earlier the cover or housing 201, includes a lower body 211 that is configured to selectively engage a base 203 at one of a multiplicity of predetermined angular rotations relative to the base; and an upper body 209 that is configured to hold the sensor. The upper body 209 has a convex exterior surface that is arranged for shielding the sensor from elements (rain, snow, bird droppings, etc.) of an outside environment. The housing, specifically the upper body 209 in various embodiments further comprises an overhanging portion 215 with a raised lip 213 that is again configured to facilitate the shielding the sensor from elements of an outside environment.

The housing 201 is further arranged to secure a sensor carrier or carrier 431. The lower body in various embodiments comprises a first bore 503 and the upper body comprises a second bore 505 with a carrier surface 433 that is generally perpendicular to the second bore 505. The first bore 503 and the second bore 505 are joined in a generally perpendicular manner to form the cover bore 415 and the sensor carrier 431 with the sensor 405 is disposed adjacent to the carrier surface 433. The housing in various embodiments can also include the retainer ring 207 wherein the sensor carrier 431 is interposed between the retainer ring 207 and the carrier surface 433.

The second bore 505 (bore in the upper housing), the sensor carrier 431, and the retainer ring 207 in various embodiments each, respectively, have at least one keying feature 435, 437, 439 to align the sensor carrier with the upper body in a predetermined manner. Note that the retainer ring also has keying tabs 441 (three shown) that align with and may be inserted through key slots 443 in the carrier 431. The keying tabs 441 can be inserted into key openings 445 that are disposed in the carrier surface 433. Note as will be appreciated the sensor carrier 431 ordinarily also includes assorted electrical circuitry that operate to condition and forward signals from the sensor. Typically a cable will be attached to the sensor carrier and routed through the first and second bores 503, 505 as well as the base bore 423 in order to get the sensor signals to the lamp controller 107 of FIG. 1. Also in some embodiments a generally translucent material will be disposed in a more or less liquid state over the retainer ring 207, sensor 405 and sensor carrier 431 and subsequently allowed to cure. This material once cured will provide protection from the elements for the sensor and electrical circuitry that is disposed on the sensor carrier. As above, the lower body 211 further comprises a bore 503 and a slotted opening 417 disposed transversally to the bore 503. The upper body 209 and the lower body 211 form an integral cover 201. The housing further comprises a locking member 205 that is arranged and configured for disposal within the slotted opening 417 to secure the cover to the base in one of the multiplicity of angular rotations.

Continuing to refer to FIG. 5, a representative cross sectional view of the sensor housing of FIG. 2-FIG. 3 in accordance with one or more embodiments will be briefly discussed and described. FIG. 5 shows a cross section vertically through the center of the sensor housing assembly of FIG. 2 through FIG. 4. This discussion is somewhat of a review of some of the above discussed concepts, but will focus on FIG. 5 (with some references to FIG. 2-FIG. 4) and the housing or sensor housing comprising a cover 201 and locking member 205. The cover 201 has a mounting surface 447 and is configured to hold a sensor 405 and is further configured to selectively engage a base 203 at one of a multiplicity of angular rotations. The mounting surface 447 in various embodiments is juxtaposed (disposed adjacent) to a shoulder 221 of the base 203 and the sensor 405 is disposed substantially perpendicular to the mounting surface 447. The locking member 205 is disposed and configured to secure the cover 201 to the base 203 in the one of the multiplicity of predetermined angular rotations. Note that if a friction fit between the cover and the base is desired (see above) a resilient washer can be disposed adjacent to the shoulder 221 and between the mounting surface 447 and the corresponding surface on the shoulder 221.

Referring to FIG. 5 and FIG. 6, as well as FIG. 2-FIG. 4, the cover comprises a slotted opening 417 that is disposed substantially parallel to the mounting surface 447. The locking member 205 comprises a leg 225, where the leg is configured to be disposed in the slotted opening 417. The locking member in various embodiments further comprises a head end 223 and one or more resilient tabs 227. The resilient tabs are configured to be disposed adjacent to an exterior surface of the cover and arranged to flex when pressure is applied to the head end 223. The cover comprises a cover bore 415 and the leg comprises an opening 419, wherein a portion 501 (engagement member 411) of the base is disposed within the cover bore and through the opening and the locking member secures the cover to the base in one of the multiplicity of angular rotations until the pressure is applied to the head end. A portion of the leg 225 is disposed in a locking groove 425 of the base until the pressure is applied to the head end. As noted above in various embodiments, the cover comprises a cover bore with an interior multi-faceted surface 601 that is configured to mesh with a complementary multi-faceted surface 413 on the base only when the cover is aligned with the base at any one of the multiplicity of predetermined angular rotations.

Also shown in FIG. 5 in cross section, is the upper o-ring 401 which is disposed in the groove 414 and sandwiched between the engagement member of the base and the interior wall of the housing or cover 201, thereby providing a weather resistant seal between the exterior of the housing and the interior as defined by the base bore 423, upper bore 505 and in part by the lower body bore 503. Further shown is the lower o-ring 403 and shroud 219 disposed around the threaded portion 217 of the base 203. Not shown in FIG. 5 is the surface 407; however it would lie between the lower o-ring 403 and the locking nut 220. When the locking nut 220 is engaged with the threaded portion 217 and secured against the surface 407 this will compress the lower o-ring 403 between the surface, e.g., an exterior side of the surface, and the shroud 219 and thus provide a weather resistant seal between the base and the surface.

Referring to FIG. 6 a bottom plan view of a cross section through the cover or housing 201 in accordance with one or more embodiments will be discussed and described. The cross section through the cover shows the bottom of the cover with the mounting surface 447 and a generally annular ring of material approximately 0.040 inches thick removed. Among other elements that are shown is an edge view of the complementary multi-faceted surface 601 (functionally described above), e.g., in this embodiment a 12 sided polygon with equal length sides disposed at an angle 607 from one side to another of nominally 210 degrees. Also shown is a ledge 603 (beginning of the interior surface of the cover 201) that is disposed within the cover where the complementary multi-faceted surface 601 ends. This ledge facilitates a proper depth of engagement, e.g., 0.010-0.012 inches, of the cover and the base when the respective multi-faceted surfaces are aligned and engaged. Other attributes that are clearly evident include the tapered nature 605 of the upper housing as well as the overhang 215. It may also be observed in this embodiment that the exterior surface of the cover at the cross section is comprised of two elliptical arcs 609, 611, rather than, e.g., circular arcs.

While many of the dimensions are not critical and those that are on a relative basis will be evident to those of ordinary skill given the discussions and descriptions provided herein, it is appropriate to note the relatively small size of the sensor housing and various components in at least one embodiment. For example, the threaded portion 217 of the base 203 may be fashioned as ½" by 14 National Pipe Thread and the overall length of the base from the end of the threaded portion to the opposite end of the engagement member is approximately 1.2 inches with a bore of just over 0.53". The cover at its widest point (where elliptical arcs join is approximately 1.2" wide, approximately 1.7" in length from the lip 213 to the surface 421, and has an overall height of approximately 1.2". The cover bore 415 varies from approximately 0.85" in the lower body to approximately 0.6" in the upper body. Generally the cover bore needs to be large enough for the engagement member of the base as well as any connector or the like that may be associated with a cable from the sensor carrier. The lower o-ring has a nominal inside diameter of 0.799" with a width of 0.103" and the upper o-ring has a nominal inside diameter of 0.612" and a width of 0.103".

Figure 7:
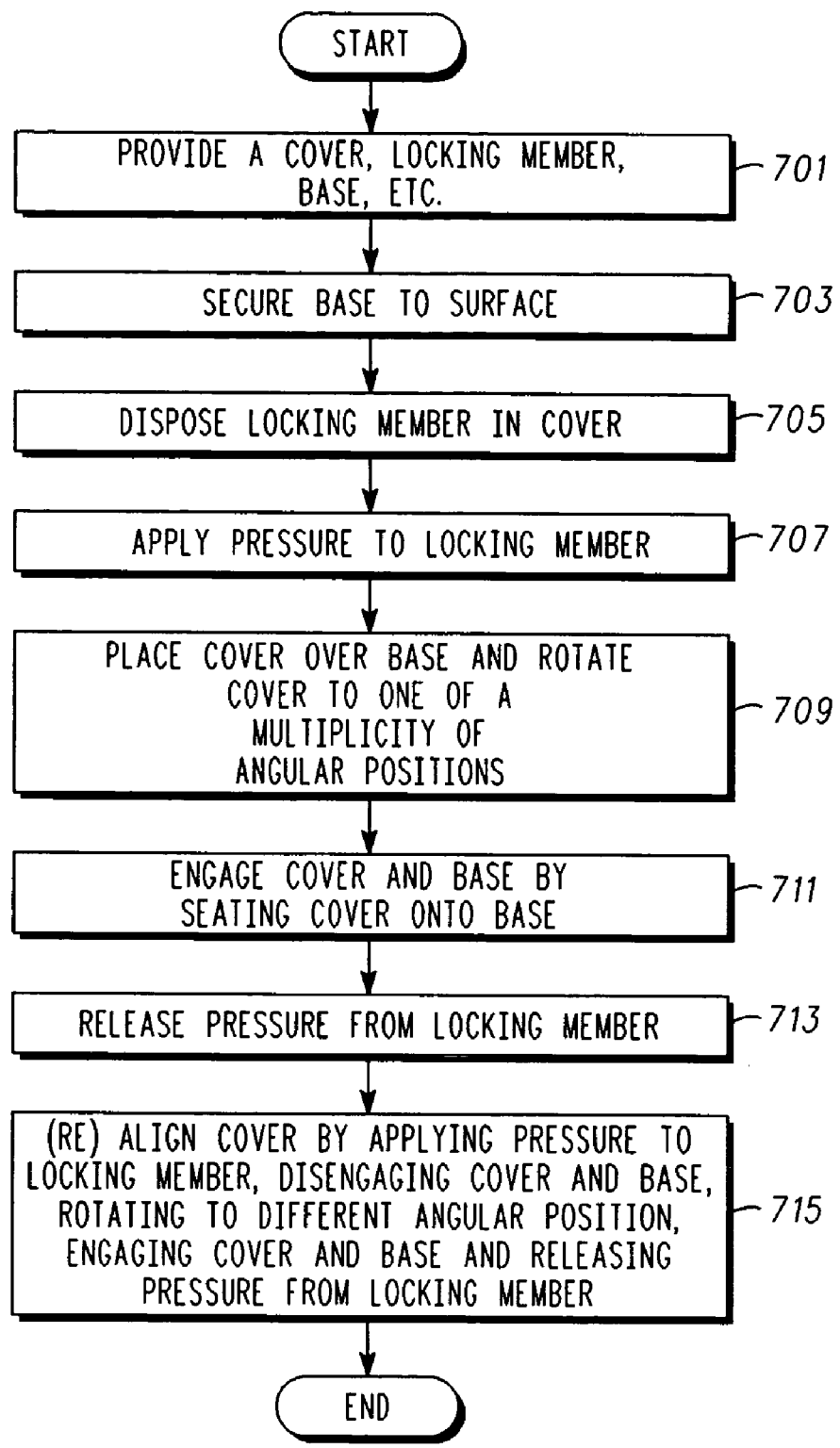
FIG. 7 illustrates a method embodiment of providing and aligning a sensor housing in accordance with one or more embodiments.

Referring to FIG. 7, a method embodiment of providing and aligning a sensor housing in accordance with one or more embodiments will be briefly discussed and described. It is noted that the method of FIG. 7 can be advantageously practiced using the apparatus and structures discussed and described above or other suitably configured structures. FIG. 7 illustrates one or more method embodiments including a method 700 of providing a sensor housing for a sensor. The method starts and 701 provides a cover that is arranged and configured to hold and protect the sensor, a locking member, a base, etc similar to those items discussed above. The method includes securing 703 the base to a mounting surface, e.g., a luminaire, and this can include assembling the shroud and o-ring over a threaded member of the base, inserting the threaded member into an opening in the surface and securing the base to the surface with a locking nut that engages the threaded member. As illustrated at 705, the method includes disposing the locking member in the cover, e.g., as described earlier. Typically the sensor will include a cable for coupling signals from the sensor or corresponding electronics to other control circuitry. Once the locking member has been disposed in the cover, the cable from the sensor can be routing through a bore through the cover and opening in the locking member and the sensor can be assembled or mounted to the cover. At this point the cable can be routed through a bore in the base. Note that securing the base to a mounting surface (luminaire) can occur long before the cover with sensor is mounted to the base.

To mount the cover to the base, the method also shows applying pressure to the locking member 707 while placing the cover over the base and rotating the cover 709 to one of a multiplicity of predetermined angular rotations relative to the base. The applying pressure to the locking member may result in flexing one or more resilient tabs as noted above. At 711 the cover and the base are engaged by seating the cover onto the base, i.e., moving the cover toward the base until they are engaged. After engaging the cover and the base the pressure to the locking member is released 713 and, e.g., the resilient tabs return to the normal position thus moving the locking member to a locking position to secure the cover to the base. Note that the engaging the cover and the base can further include engaging complementary multi-faceted surfaces when the cover is seated onto the base as described above. In one or more embodiments, the cover can only be seated onto the base when these complementary multi-faceted surfaces are aligned such that they no longer interfere with each other. Note that all of the above discussed processes can advantageously occur in initial assembly of the sensor housing to, e.g., a luminaire.

Once the luminaire or other surface is finally installed or if for some reason it is reoriented, the cover for the sensor may need to be aligned or re-aligned. This is readily accomplished and the method 700 includes aligning 715 the cover to a desired direction for the sensor, where the aligning comprises disengaging the cover and the base, rotating the cover to a different one of the multiplicity of predetermined angular rotations, and re-engaging the cover and the base. More specifically, the aligning the cover to a desired direction further comprises applying pressure to the locking member, unseating the cover and base, and after re-engaging the cover to the base by re-seating the cover to the base at a new angular rotation again releasing the pressure to the locking member.

The housing and housing systems, discussed above, and the inventive principles thereof are intended to and can alleviate various problems associated with the deployment of a luminaire that are inherent in prior art techniques. This is particularly so for a luminaire that utilizes a photo sensor to detect, e.g., ambient light levels such as those associated with differences between night and day or the like. By providing a small sensor housing that can be assembled to the luminaire prior to a final installation and then allowing the sensor to be easily aimed or pointed in an appropriate direction during or after the final installation, technicians will benefit by avoiding awkward activities (disassembly of the luminaire and remounting/reorienting a sensor housing in often precarious situations (high on an overhead hoist). In general it is expected that the relative convenience of the aiming and aligning activity for the sensor will result in higher quality installations with more accurate sensor orientations, and this in turn will result in lower costs with more accurate control of the luminaire light output.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A sensor housing comprising:
   a base;
   a cover configured to hold a sensor and selectively engage the base at one of a multiplicity of angular rotations; and
   a locking member disposed and configured to secure the cover and the base in the one of the multiplicity of angular rotations, the locking member accessible from an exterior of the sensor housing;
   wherein the base further comprises a shoulder and a threaded member that is configured to pass through a shroud and an o-ring such that the shroud is disposed adjacent to the shoulder and above the o-ring, where the o-ring provides a weather resistant seal when the base is secured to a surface with a locking nut engaged with the threaded member.

2. The sensor housing of claim 1 wherein the base further comprises an engagement member having a multi-faceted surface and the cover further comprises a complementary multi-faceted surface, wherein the cover and the base can be selectively engaged only when the multi-faceted surface and the complementary multi-faceted surface are aligned at any one of the multiplicity of angular rotations.

3. A sensor housing comprising:
   a base;
   a cover configured to hold a sensor and selectively engage the base at one of a multiplicity of angular rotations; and
   a locking member disposed and configured to secure the cover and the base in the one of the multiplicity of angular rotations, the locking member accessible from an exterior of the sensor housing;
   wherein the base further comprises an engagement member having a multi-faceted surface and the cover further comprises a complementary multi-faceted surface, wherein the cover and the base can be selectively engaged only when the multi-faceted surface and the complementary multi-faceted surface are aligned at any one of the multiplicity of angular rotations.

4. The sensor housing of claim 3 wherein the multi-faceted surface is disposed about an exterior of the engagement member and the complementary multi-faceted surface is disposed about an interior of the cover.

5. The sensor housing of claim 3 wherein the cover is configured to be disposed over and surround the engagement member and configured to removably engage the base at the one of the multiplicity of angular rotations that provides a predetermined orientation for the cover.

6. The sensor housing of claim 3 wherein the engagement member further comprises a groove configured for disposal of an o-ring, wherein the o-ring provides a weather resistant seal between the cover and the engagement member when the cover and the base are engaged.

7. A sensor housing comprising:
   a base;
   a cover configured to hold a sensor and selectively engage the base at one of a multiplicity of angular rotations; and
   a locking member disposed and configured to secure the cover and the base in the one of the multiplicity of angular rotations, the locking member accessible from an exterior of the sensor housing;
   wherein:
   the cover further comprises a cover bore and a slotted opening disposed transversally to the cover bore;
   the locking member further comprises a leg with an opening, where the leg is configured to be disposed in the slotted opening; and
   the locking member further comprises a head end and at least one resilient tab, the resilient tab configured to be disposed adjacent to the cover and arranged to flex when pressure is applied to the head end.

8. The sensor housing of claim 7 wherein the cover further comprises: a lower body configured to selectively engage the base at the one of a multiplicity of angular rotations; and an upper body configured to hold the sensor.

9. The sensor housing of claim 7 wherein the base and the cover collectively provide the sensor housing when engaged.

10. The sensor housing of claim 7 wherein: the base further comprises an engagement member that is arranged for disposal in the cover bore through the opening in the leg; and wherein the locking member secures the cover and the base in the one of the multiplicity of angular rotations until the pressure is applied to the head end.

11. The sensor housing of claim 7 wherein the base further comprises a bore and the base further comprises a locking groove disposed transversally to the bore such that a portion of the leg is disposed in the locking groove until the pressure is applied to the head end.

12. The sensor housing of claim 11 wherein the locking groove further comprises a bottom surface that includes a multi-faceted surface and the portion of the leg includes a complementary multi-faceted surface that meshes with a portion of the multi-faceted surface when the cover and the base are secured in the one of the multiplicity of angular rotations.

13. The sensor housing of claim 7 wherein the base further comprises an engagement member having a multi-faceted surface and the cover further comprises a complementary multi-faceted surface, wherein the cover and the base can be selectively engaged only when the multi-faceted surface and the complementary multi-faceted surface are aligned at any one of the multiplicity of angular rotations.

14. The sensor housing of claim 7 wherein the base further comprises a shoulder and a threaded member that is configured to pass through a shroud and an o-ring such that the shroud is disposed adjacent to the shoulder and above the o-ring, where the o-ring provides a weather resistant seal when the base is secured to a surface with a locking nut engaged with the threaded member.

15. A housing for securing a sensor, the housing comprising:
   a lower body configured to selectively engage a base at one of a multiplicity of angular rotations relative to the base and be removably secured to the base by a locking means that is accessible from an exterior of the housing; and
   an upper body configured to hold the sensor, the upper body having a convex exterior surface arranged for shielding the sensor from elements of an outside environment; wherein
   the housing is further arranged to secure a sensor carrier wherein:
   the lower body further comprises a first bore; and
   the upper body further comprises a second bore with a carrier surface that is generally perpendicular to the second bore, where the first bore and the second bore are joined in a generally perpendicular manner and the sensor carrier with the sensor is disposed adjacent to the carrier surface.

16. The housing of claim 15 wherein the upper body further comprises an overhanging portion with a raised lip configured to facilitate the shielding the sensor from elements of an outside environment.

17. The housing of claim 15 further comprising a retainer ring wherein the sensor carrier is interposed between the retainer ring and the carrier surface.

18. The housing of claim 15 wherein the second bore, the sensor carrier, and the retainer ring each have at least one keying feature to align the sensor carrier with the upper body in a predetermined manner.

19. The sensor housing of claim 15 wherein the housing further comprises a locking member arranged and configured for disposal within the slotted opening to secure the cover to the base in the one of the muitiplicity of angular rotations.

20. A sensor housing comprising:
 a cover having a mounting surface, the cover configured to hold a sensor and further configured to selectively engage a base at one of a multiplicity of angular rotations, where the mounting surface is juxtaposed to a shoulder of the base and the sensor is disposed substantially perpendicular to the mounting surface; and
 a locking member disposed and configured to secure the cover to the base in the one of the multiplicity of angular rotations, the locking member accessible from an exterior of the sensor housing; wherein:
  the cover further comprises a slotted opening that is disposed substantially parallel to the mounting surface;
  the locking member further comprises a leg, where the leg is configured to be disposed in the slotted opening; and
  the locking member further comprises a head end and at least one resilient tab, the resilient tab configured to be disposed adjacent to an exterior surface of the cover and arranged to flex when pressure is applied to the head end.

21. The sensor housing of claim 20 wherein: the locking member is disposed substantially within the cover.

22. The sensor housing of claim 20 wherein the cover further comprises a cover bore and the leg comprises an opening, wherein a portion of the base is disposed within the cover bore and through the opening and the locking member secures the cover to the base in the one of the multiplicity of angular rotations until the pressure is applied to the head end.

23. The sensor housing of claim 22 wherein a portion of the leg is disposed in a locking groove of the base until the pressure is applied to the head end.

24. A sensor housing comprising:
 a cover having a mounting surface, the cover configured to hold a sensor and further configured to selectively engage a base at one of a multiplicity of angular rotations, where the mounting surface is juxtaposed to a shoulder of the base and the sensor is disposed substantially perpendicular to the mounting surface; and
 a locking member disposed and configured to secure the cover to the base in the one of the multiplicity of angular rotations, the locking member accessible from an exterior of the sensor housing; wherein:
  the cover further comprises a slotted opening that is disposed substantially parallel to the mounting surface;
  the locking member further comprises a leg, where the leg is configured to be disposed in the slotted opening; and
  the cover comprises a cover bore with an interior multi-faceted surface that is configured to mesh with a complementary surface on the base only when the cover is aligned with the base at any one of the multiplicity of angular rotations.

25. A method of providing a sensor housing for a sensor, the method comprising:
 securing a base to a mounting surface;
 disposing a locking member in a cover, the cover configured to hold the sensor;
 applying pressure to the locking member while placing the cover over the base and rotating the cover to one of a multiplicity of angular rotations;
 engaging the cover and the base by seating the cover onto the base; and
 releasing the pressure to the locking member.

26. The method of claim 25 wherein the securing the base to a mounting surface further comprises placing an o-ring over a threaded member of the base and securing the base with a locking nut.

27. The method of claim 25 wherein the applying pressure to the locking member further comprises flexing one or more resilient tabs.

28. The method of claim 25 wherein the engaging the cover and the base further comprises engaging complementary multi-faceted surfaces when the cover is seated onto the base.

29. The method of claim 25 further comprising aligning the cover to a desired direction for the sensor, the aligning comprising disengaging the cover and the base, rotating the cover to a different one of the multiplicity of angular rotations, and re-engaging the cover and the base.

30. The method of claim 29 wherein the aligning the cover to a desired direction further comprises applying the pressure to the locking member, unseating the cover and base, and after the re-engaging the cover to the base by re-seating the cover to the base again releasing the pressure to the locking member.

31. A method of aligning a sensor that is disposed in a cover in a desired direction, the cover engaged with a base and secured by a locking member that is disposed in the cover, the method comprising: disengaging the cover and the base; rotating the cover to one of a multiplicity of angular rotations; and re-engaging the cover and the base;
 wherein the disengaging the cover and the base further comprises applying pressure to the locking member, unseating the cover and base, and after the re-engaging the cover to the base by re-seating the cover to the base, releasing the pressure to the locking member.

32. The method of claim 31 wherein disengaging the cover and the base comprises sliding the locking member within the cover.

* * * * *